R. H. THROCKMORTON.
MANURE SPREADER.
APPLICATION FILED NOV. 25, 1911.
1,023,342.
Patented Apr. 16, 1912.
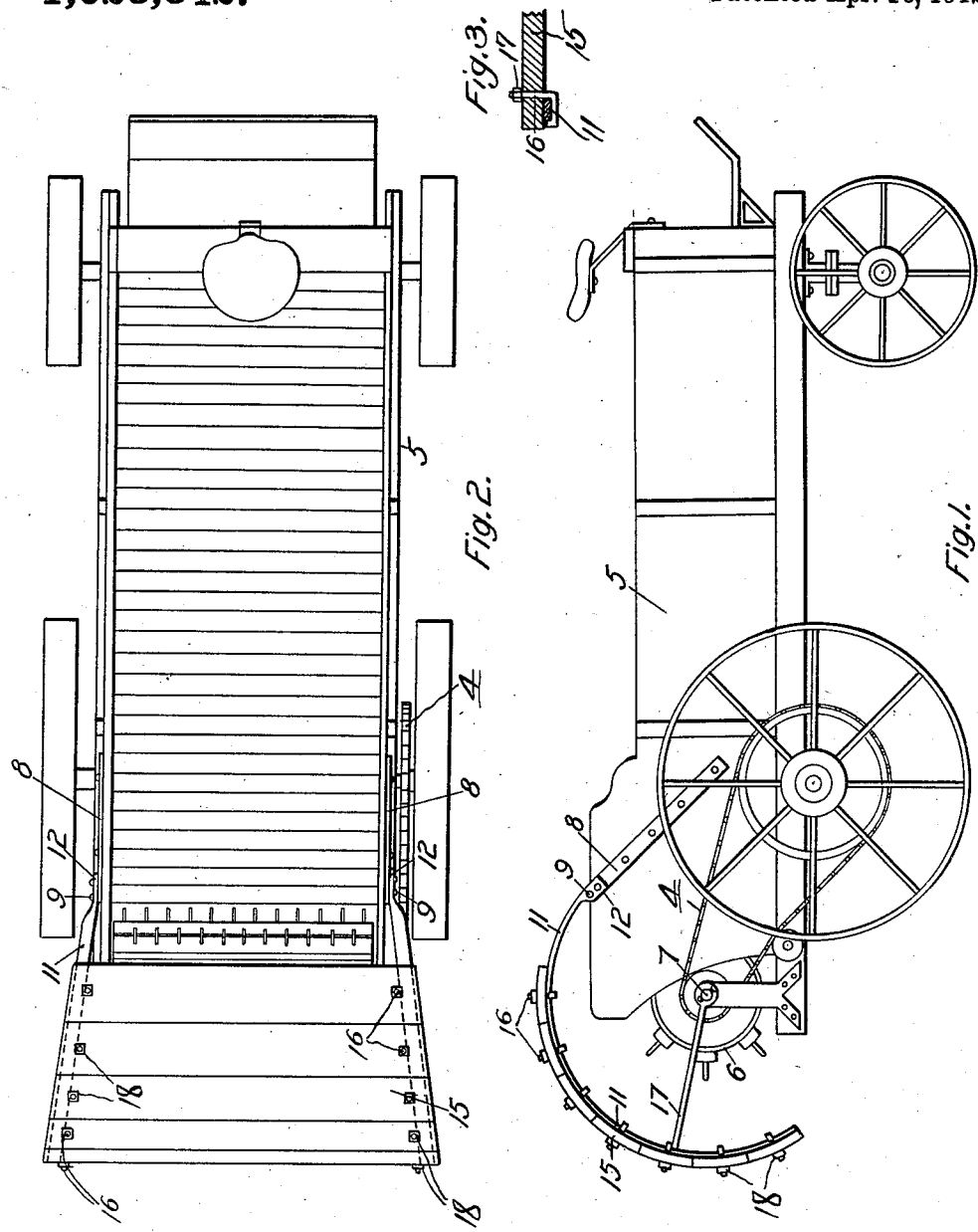
R. H. Throckmorton.
Inventor

UNITED STATES PATENT OFFICE.

RALPH H. THROCKMORTON, OF HOMESTEAD, NEBRASKA.

MANURE-SPREADER.

1,023,342.  Specification of Letters Patent.  Patented Apr. 16, 1912.

Application filed November 25, 1911. Serial No. 662,446.

*To all whom it may concern:*

Be it known that I, RALPH H. THROCKMORTON, citizen of the United States, residing at Homestead, in the county of Greeley and State of Nebraska, have invented certain new and useful Improvements in Manure-Spreaders, of which the following is a specification.

The present invention relates in general to fertilizer distributers, and more particularly to an attachment which is adapted to be applied to the fertilizers now in general use, and which embodies novel features of construction whereby the fertilizer will be distributed in a more uniform manner and over a greater area than is ordinarily done.

The object of the invention is to provide an attachment of this character which is simple and inexpensive in its construction, and which can be easily applied to or detached from the distributers now in common use, without changing the construction of the distributer.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a fertilizer distributer having the invention applied thereto. Fig. 2 is a top plan view thereof, and Fig. 3 is a detail view of one of the bolts employed for securing the boards constituting the shield to the supporting bars.

Corresponding and like parts are referred to in the following description and indicated in all the views of the drawings by the same reference characters.

Referring to the drawing, 5 designates an ordinary fertilizer distributer of the wagon type, having a rotary spreader 6 mounted upon the shaft 7, the said shaft being geared to one of the supporting wheels in any suitable manner, such as by means of the chain and sprocket connection 4. Secured to opposite sides of the body are the strips 8—8, the said strips ordinarily serving as a support for a rake frame which is designed to coöperate with the toothed drum or spreader 6 to regulate the discharge of the fertilizer. In the present instance, however, the rake frame is removed and the upper ends of the curved bracket arms 11 secured thereto. It will be observed that the upper ends of these brackets 11 are flattened at 12 so as to fit against the strips 8, bolts 9 being employed for securing the flattened portions 12 to the said strips. These curved brackets 11 diverge rearwardly and downwardly and are connected by means of braces 17 to the shaft 7 of the toothed distributing drum 6. These braces 17 are rigidly secured at one end to the respective brackets 11, the opposite ends thereof being formed with rings or eyes adapted to be fitted removably over the ends of the shaft 7.

A shield or guard is carried by the curved brackets 11, the said shield being formed of a number of transverse strips or boards 15 which are applied to the brackets 11. These strips 15 are shown as secured to the curved brackets by means of hook bolts 16, the hooked ends thereof being designed to engage the brackets, while the opposite ends thereof extend through the boards and are capped by the nuts 18. It will thus be obvious that the boards can be readily moved up and down upon the brackets as desired, and the necessity of drilling holes in the brackets is thus eliminated.

In the operation of the spreader, the fertilizer is discharged from the wagon body against the curved shield or guard formed by the boards 15 and as it drops is deflected forwardly by the curved lower end of the shield. As a result, the fertilizer is broken up and scattered uniformly so as to drop down upon the ground in the path of the fertilizer distributer exactly where it belongs. Ordinarily, the fertilizer has a tendency to roll up together and feeds from the wagon in a narrow and irregular line which is far from satisfactory. Furthermore, when the wind is blowing, the fertilizer is frequently blown to one side so as to lodge where it is not wanted. The present invention eliminates this objection by providing a curved shield which extends around the rear of the rotary distributing drum and upon which the fertilizer is discharged by the distributing drum, the said shield serving to break up the fertilizer and cause it to drop exactly where it belongs and be uniformly scattered over the path of the vehicle.

Having thus described the invention, what I claim as new and desire to secure by Letters Patent, is:—

In a fertilizer distributer, the combination of a wagon body provided with bearings, a shaft journaled in the bearings, a rotary distributer drum mounted upon the shaft, means for driving the distributing drum, strips applied to opposite sides of the wagon body, a pair of curved brackets having the upper ends thereof detachably secured to the said strips, braces secured to the curved brackets and formed at the free ends with eyes adapted to be fitted over the ends of the before mentioned shaft, and a shield connecting the curved brackets and carried thereby, the said shield extending around the rear of the rotary discharging drum and the fertilizer being discharged against the shield by the distributing drum so as to be broken up thereby as it falls to the ground.

In testimony whereof I affix my signature in presence of two witnesses.

RALPH H. THROCKMORTON.

Witnesses:
M. T. CLEMENT,
L. J. CLAPP.

Copies of this patent may be obtained for five cents each, by addressing the "Commissioner of Patents, Washington, D. C."